March 20, 1928.  
J. F. WHITE  
RADIATOR CAP  
Filed April 27, 1925  
1,662,911
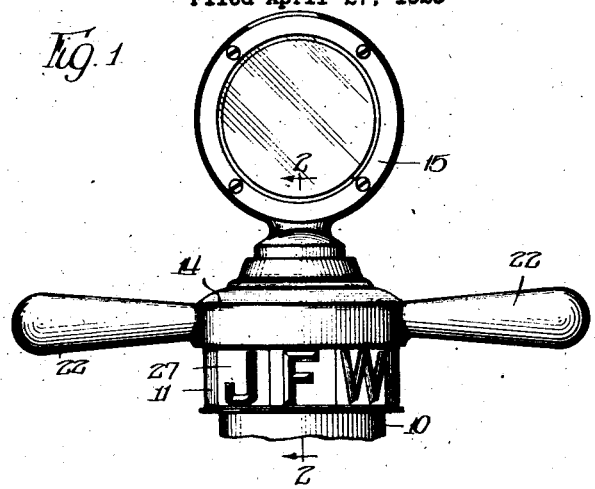
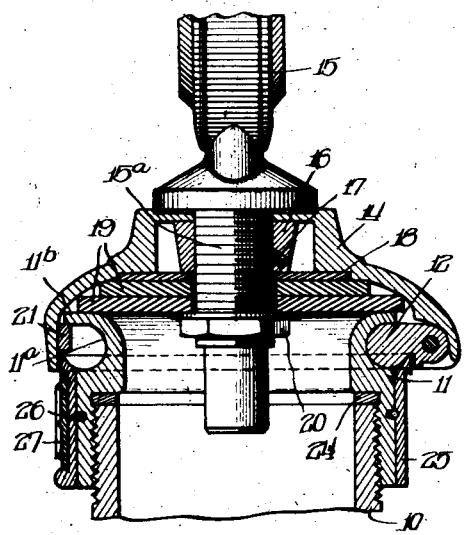
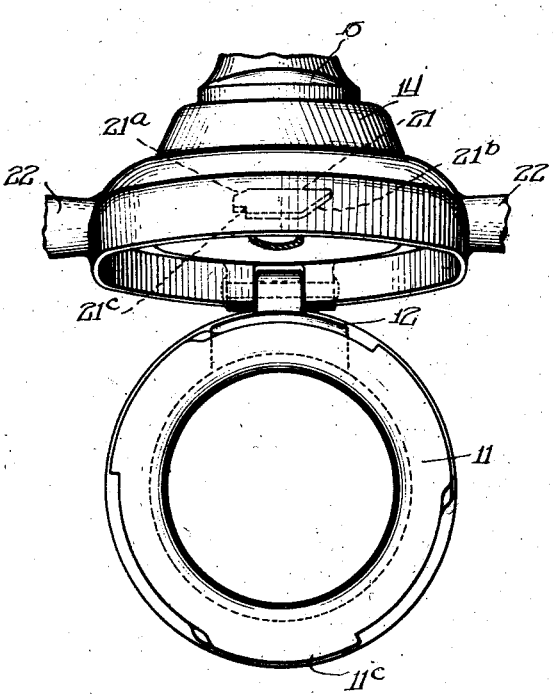
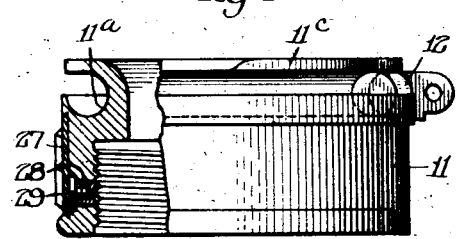
Witness:  
R. Burkhardt.
Inventor:  
John F. White,  
By Patented Mar. 20, 1928.

1,662,911

UNITED STATES PATENT OFFICE.

JOHN F. WHITE, OF CHICAGO, ILLINOIS, ASSIGNOR TO WHITE PRODUCTS COMPANY, OF CHICAGO, ILLINOIS, A CORPORATION OF ILLINOIS.

RADIATOR CAP.

Application filed April 27, 1925. Serial No. 25,962.

This invention relates to fittings for filling spouts of automobile radiators, and the like, and is concerned with the provision of a closure for the filling spout and the retention against theft of an indicating instrument, ornament, or other display device.

One of the objects of the invention is the provision of a device of this kind which may be adapted to various standard radiator tubes without requiring any changes in the latter, whereby the device may be sold as accessory equipment ready for mounting on the vehicles.

Another object is the provision of such a device which may be attached to the radiator tube without the use of tools and which may be effectively secured in place without requiring any mutilation of the tube or its threads.

Another object is the provision of such a device which may be operated with ease in opening and closing and which will form a tight seal, whereby it is adapted to be employed on automobiles in which a condensing cooling system is used.

Still another object is the provision of such a device which is arranged to carry identifying characters, and to accommodate positioning thereof in the desired location with respect to the vehicle.

Other and further objects will be pointed out hereinafter, indicated in the appended claims or obvious to one skilled in the art upon an understanding of the present disclosure.

For the purpose of this application I have illustrated certain forms in which the invention may be embodied, but it is to be understood that the same are presented here for the purpose of illustration only, and are not to be construed in any sense as having the effect of limiting what I claim as the invention.

In the drawing forming a part of this specification,

Fig. 1 is a front elevational view of a device embodying the invention, as it would appear attached to an automobile radiator filling spout, Fig. 2 is a sectional elevation taken on front to rear, Fig. 3 is a top view with the cap swung back; and Fig. 4 is a detail illustrating in elevation, partly in section, a modified form of the attaching member.

Described generally, the invention contemplates the provision of an attaching member in the nature of a bushing, which is adapted for connection to the automobile radiator spout by screw thread engagement or the like. This connecting member carries a hinge member which is movable circumferentially thereon and forms a mounting for a closure cap which is adapted to swing to and from a position closing the upper end of the bushing. The cap carries a sealing device adapted to be compressed upon the top of the bushing, and cooperating securing members are associated with the cap and bushing whereby the cap may be retained in closed position. Means is also provided whereby the cap may be engaged with the bushing so that the latter may be rotated in proper direction to connect it with the radiator spout, but the formation of the members is such that reverse rotation of the cap will be ineffective to back the connecting member off the spout. The arrangement of the securing members is such that the cap may be freed, so as to swing to open position, by rotation in either direction on the bushing. An arrangement is provided for mounting identifying plates on the bushing, whereby the initials of the owner's name, or other selected identifying or ornamental elements, may be secured to it.

The nature of the invention will be more definitely understood by reference to the illustrated embodiments, in which it is to be understood that the reference character 10 designates the filling spout of an automobile radiator, or the like, which is screw threaded or otherwise formed for the attachment of a closure. My improved device comprises a connecting member 11 in the nature of an annular bushing formed for connective engagement with the radiator spout. At its upper portion it is formed with a peripheral seat 11$^a$ and an overhanging flange 11$^b$, the top of which forms a seat for a sealing device. The flange 11$^b$ is notched at intervals so as to leave portions extending in the form of cap retaining lugs 11$^c$. A seat 11$^a$ forms a retaining runway for a hinge member 12, to which a closure cap 14 is connected, the arrangement permitting rotation of the cap on the bushing incident to circumferential travel of the hinge member 12. The cap 14 is adapted to cover and close the upper end of the bushing 11, and it affords a mounting for a display device 15, the stem or post 15ª of which is accommodated by an axial aperture in the cap. A nut 16 secures the device 15 to the cap, and is retained against dislodgment by a set screw 17 which is broken off after it is set up, so that it cannot be backed out. A washer 18 and a sealing disk 19 are retained on the stem 15ª by means of a nut 20, and the sealing disk is adapted to seat on the top of the bushing 11 to form a tight closure therefor. The cap carries a retaining lug 21, which, as illustrated in Fig. 3, has a bevelled upper corner 21ª at its left hand end and a bevelled lower corner 21ᵇ at its right hand end, and has its lower left hand corner notched at 21ᶜ. The size of the cap and of the member 21 is such that the latter is accommodated by the notched portions of the bushing flange 11ᵇ, so that when the cap is swung down to closed position on the bushing the bevelled corner 21ª may find wedging engagement under the end of one of the retaining lugs 11ᶜ, whereupon clockwise rotation of the cap will carry the member 21 under such lug 11ᶜ, wedging the cap closed and compressing the sealing disk 19 on the upper end of the bushing. Rotation of the cap in either direction to disengage the lug 21 from the retaining lug 11ᶜ will free the cap so that it may be swung to open position. The notched portion 21ᶜ affords a means for operatively engaging the lug 21 with one of the retaining lugs 11ᶜ in such fashion that clockwise rotation of the cap will be effective to rotate the bushing. It is in this fashion that the device is attached to the radiator spout. The cap preferably is provided with radially extending handles 22 whereby effective leverage may be exerted upon it to turn the bushing down tight on the threads of the spout and to rotate the cap for disengaging the lugs to permit opening the cap. A compressible washer 24, made of lead or other suitable material, is provided to form a sealed joint between the bushing and the spout and to contribute to the tightness of their engagement. Once the device is properly seated on the spout, it cannot be backed off by counterclockwise rotation of the cap, as the bevelled right hand end 21ᵇ of the lug 21 prevents effective engagement thereof with the bushing such as will permit the latter to be rotated. Mounted on the bushing 11 is a free ring 25, rotatably held in place by means of the spring ring 26. The free ring 25 has its peripheral face channelled for the reception and retention of mountings 27, which may carry identifying or decorative devices. These may be introduced by way of a notch at one side of the ring, and then moved around to the channel to a desired position. By adjustment of the ring 25 on the bushing they may be positioned at the front or other desired portion of the device. On the modified form of bushing illustrated in Fig. 4 the free ring 25 is omitted, the skirt of the bushing itself being channelled to accommodate the mountings 27. In this form it may be desirable, although not necessary, to provide a set screw for retaining the bushing on the spout. This may be seated in the skirt of the bushing in position to be covered by the mounting 27. A convenient form of set screw to frustrate removal is one which comprises the threaded bushing 28 in which is a short headed screw 29 which may be engaged by a screw driver to set up the bushing 28 against the thread of the radiator spout. Attempt at reverse rotation will simply back the screw 29 out of the bushing 28, leaving the latter in securing engagement with the spout. In this embodiment the hinge member 12 travels circumferentially in the seat 11ª, as in the form first described, and in the same sort of means is shown for holding the cap closed.

Among the various advantages of a device containing features of the present invention is the ability to open the same by rotation of the cap in either direction. This feature, together with the fact that the cap is perfectly free to rotate in either direction, obviates the danger of injury to the device by application of undue force to the handles. However, the construction provides a convenient arrangement whereby substantial pressure may be applied to the sealing gasket with comparative ease, so as to seal the radiator spout effectively. The securing means are effectively concealed, and the construction lends itself to embodiment in graceful an appropriate contour. The freely rotatable collar 25 precludes the engagement of the skirt of the bushing by a wrench in such fashion as to permit its being unscrewed.

What I claim is:

1. An automobile radiator attachment comprising a connecting bushing, a swinging cap arranged to cover the end of the bushing, a hinge member connecting the cap to the bushing, said hinge member being revoluble circumferentially of the bushing and concealed by the cap when in closed position, and means for retaining the cap in closed position.

2. A device of the sort described comprising a connecting bushing for engaging the radiator spout, a swinging cap for housing the end thereof, a hinge member housed between and connecting the cap and bushing and freely revoluble circumferentially of the latter in either direction, and means for retaining the cap in closed position.

3. An automobile radiator attachment comprising, in combination, a tubular bushing having an annular channel, a hinge member retained in said channel for revoluble movement circumferentially of the bushing, a cap connected to the hinge member, and a retaining member on the cap engageable with a wall of the channel to hold the cap closed on the bushing.

4. An automobile radiator attachment comprising, in combination, a tubular bushing formed with an annular groove, a hinge member retained for travel in the groove, a cap connected to the hinge member for closing the bushing, and a retaining member on the cap engageable in the groove to retain the cap closed on the bushing.

5. In an automobile radiator attachment, in combination, a bushing for connection with the radiator spout and provided with a circumferential groove, a hinge member retained in the groove for unlimited revolution in either direction circumferentially of the bushing, a cap hinged on the hinge member and adapted to close the end of the bushing, and a retaining member on the cap adapted for bayonet slot cooperative with the groove to retain the cap in closed position.

In testimony whereof I have hereunto subscribed my name.

JOHN F. WHITE.